United States Patent Office 2,784,167
Patented Mar. 5, 1957

2,784,167
MASTICATING SYNTHETIC RUBBER

Paul Schneider, Opladen, and Guido Fromandi, Leverkusen-Bayerwerk, Germany, assignors to Farbenfabriken Bayer Aktiengesellschaft, Leverkusen, Germany, a corporation of Germany No Drawing. Application December 30, 1952
Serial No. 328,806

Claims priority, application Germany January 3, 1952

8 Claims. (Cl. 260—30.8)

This invention relates to a process of catalytically masticating synthetic rubber, particularly one selected from the group consisting of diolefin polymers and copolymers of diolefins and comonomers containing the terminal group $CH_2=C<$.

It is known to catalytically accelerate mastication of rubber by means of small quantities of peptizing agents, for instance, aromatic thiophenols as well as their zinc salts and disulfides. This acceleration is substantially increased with increase of temperatures. When these peptizing agents are used in large scale production, the rubber is mostly heated to temperatures above 120° C.

Synthetic rubber to which heavy metal salts, such for example as iron salts, have been added either during manufacture or after polymerization, differ in their reaction during mastication with peptizing agents from natural rubber or polymers which are free of heavy metal salts. The mastication in the heat of synthetic rubber containing heavy metals results, transiently, in the desired decrease in molecular weight, but on further mastication the depolymerization is masked by a hardening effect which depends upon the nature of the peptizing agents used and is undesired in practice as leading to products of poor plasticity, which are difficult to work.

The present invention is based on the discovery that the above undesired hardening effect can be avoided by addition of aromatic polyhydroxy compounds. In the process of the invention an aromatic polyhydroxy compound is added to the synthetic rubber at the beginning of the mastication simultaneously with the peptizing agent. Suitable aromatic polyhydroxy compounds are, for instance, catechol, resorcinol, hydroquinone and its substitution products, dihydroxy-naphthalenes and their substitution products, pyrogallol, hydroxy-hydroquinone, and dihydroxy-anthraquinones. Hydroquinone and 1.3-dihydroxy-naphthalene have proved to be particularly suitable for the process of the invention.

The above described aromatic polyhydroxy compounds are employed in the process of the invention in quantities which depend upon the amount of the peptizing agent used. For most fields of application twice the amount of the peptizing agent is the upper limit; preferably a proportion of 5–60 percent, calculated on the peptizing agent, is employed.

Due to their anti-ageing properties the aromatic polyhydroxy compounds have an advantageous effect on the masticated synthetic rubber and vulcanizates made therefrom.

The invention is further illustrated by the following examples in which the process of the invention is compared with that of the prior art.

Example 1

In a Werner-Pfleiderer kneader of the type GR6 of a capacity of 5 liters, which is heated to 150° C., 2000 grams of a copolymer consisting of 70 parts by weight of butadiene and 30 parts of styrene and having a plasticity number of 600 (determined by the Williams method), to which 0.10 part by weight of iron linoleate (calculated on the solid substance) was added after polymerization to the latex, are mixed according to the prior art with 30 grams of pentachloro-thiophenol. Test samples were taken from the kneader at the intervals indicated in the following table and the Williams plasticity number was measured. Already after a brief period of mastication an essential increase in plasticity results (control test). In a number of further tests the hardening is substantially inhibited and furthermore the mastication considerably accelerated by adding according to the invention to the pentachloro-thiophenol prior to mastication 7.5 grams of an aromatic polyhydroxy compound as specified in the table below.

| Test | Polyhydroxy Compound | Williams Plasticity Number after— | | |
|---|---|---|---|---|
| | | 5 mins. | 15 mins. | 25 mins. |
| Control test | | 470 | 510 | 550 |
| 1 | 7.5 g. hydroquinone | 260 | 120 | 130 |
| 2 | 7.5 g. resorcinol | 360 | 260 | 270 |
| 3 | 7.5 g. catechol | 410 | 360 | 310 |
| 4 | 7.5 g. tetrachlorohydroquinone | 260 | 175 | 140 |
| 5 | 7.5 g. 2,5-dialkylhydroquinone | 300 | 130 | 155 |
| 6 | 7.5 g. 1,3-dihydroxynaphthalene | 265 | 125 | 90 |
| 7 | 7.5 g. 2,3-dichloro-1,4-dihydroxynaphthalene | 425 | 300 | 175 |

Example 2

When the pentachloro-thiophenol used in Example 1 is replaced by 40 grams of 2.4.5-trichloro-thiophenol hardening occurs in the control test, but is overcome in a further test by the addition according to the invention of 12 grams of hydroquinone.

| 2.4.5-trichlorothiophenol, grams | Hydroquinone grams | Williams Plasticity Number after— | | |
|---|---|---|---|---|
| | | 5 mins. | 15 mins. | 25 mins. |
| 40 | ---- | 565 | 415 | 475 |
| 40 | 15 | 480 | 380 | 325 |

Example 3

The pentachloro-thiophenol used in Example 1 is replaced by 40 grams of a 36.5 percent solution of xylyl-mercaptane in paraffin oil. The following table shows the plasticity numbers obtained under like conditions in a control test and in a further test with the addition according to the invention of hydroquinone, which results in the repression of hardening and furthermore in a substantial acceleration of mastication.

| 36.5% solution of xylyl-mercaptane, grams | Hydroquinone, grams | Williams Plasticity Number after— | | |
|---|---|---|---|---|
| | | 5 mins. | 15 mins. | 25 mins. |
| 40 | ---- | 330 | 280 | 360 |
| 40 | 12 | 275 | 220 | 185 |

Example 4

In the apparatus described in Example 1 2000 grams of a copolymer of butadiene and styrene, which has been obtained at temperatures slightly above the freezing point in the presence of iron salts, are masticated in a control test with 30 grams of o.o'-dibenzamido-diphenyl disulfide. Hardening sets in after mastication at 150° C. for 25 minutes. In a further test, by addition according to the invention of hydroquinone the rate of mastication is increased and the hardening completely eliminated.

| o.o'-dibenz-amido-diphenyl-disulfide, grams | hydro-quinone, grams | Williams Plasticity Number after— | | |
|---|---|---|---|---|
| | | 5 mins. | 15 mins. | 25 mins. |
| 30 | ------ | 260 | 160 | 220 |
| 30 | 6 | 250 | 145 | 125 |

*Example 5*

The synthetic rubber used in Example 4 is replaced by a copolymer of butadiene and acrylonitrile, which contains 0.3 part by weight of iron oleate. Mastication in a control test with 40 grams of pentachloro-thiophenol is accompanied with hardening which is not observed with the iron-free polymer. On addition according to the invention of 15 grams of hydroquinone to the pentachloro-thiophenol in a further test, the plasticity numbers obtained on mastication closely resemble those of the polymer when free from heavy metals.

| pentachloro-thiophenol, grams | iron oleate, grams | hydro-quinone, grams | Williams Plasticity Number after— | | |
|---|---|---|---|---|---|
| | | | 5 mins. | 15 mins. | 25 mins. |
| 40 | ------ | ------ | 465 | 340 | 300 |
| 40 | 0.3 | ------ | 500 | 520 | 570 |
| 40 | 0.3 | 15 | 470 | 375 | 320 |

We claim:

1. A process for avoiding hardening during mastication, of an iron-salt-containing synthetic rubber selected from the group consisting of diolefin homopolymers and copolymers of diolefins and comonomers containing the terminal group CH$_2$=C<, which comprises adding a polyhydric phenol at the beginning of the mastication simultaneously with a thiophenol selected from the group consisting of thiophenols, zinc salts of thiophenols and thiophenol disulfides.

2. A process for avoiding hardening during mastication, of an iron-salt-containing synthetic rubber selected from the group consisting of diolefin homopolymers and copolymers of diolefins and comonomers containing the terminal group CH$_2$=C<, which comprises adding a polyhydric phenol selected from the group consisting of catechol, resorcinol, hydroquinone, dihydroxynaphthalene, pyrogallol, hydroxy-hydroquinone and dihydroxyanthraquinone at the beginning of the mastication simultaneously with a thiophenol selected from the group consisting of thiophenols, zinc salts of thiophenols and thiophenol-disulfides.

3. A process for avoiding hardening during mastication, of an iron-salt-containing synthetic rubber selected from the group consisting of diolefin homopolymers and copolymers of diolefins and comonomers containing the terminal group CH$_2$=C<, which comprises adding 1,3-dihydroxynaphthalene at the beginning of the mastication simultaneously with a thiophenol selected from the group consisting of thiophenols, zinc salts of thiophenols and thiophenol-disulfides.

4. A process for avoiding hardening during mastication, of an iron-salt-containing synthetic rubber selected from the group consisting of diolefin homopolymers and copolymers of diolefins and comonomers containing the terminal group CH$_2$=C<, which comprises adding catechol at the beginning of the mastication simultaneously with a thiophenol selected from the group consisting of thiophenols, zinc salts of thiophenols and thiophenol-disulfides.

5. A process for avoiding hardening during mastication, of an iron-salt-containing synthetic rubber selected from the group consisting of diolefin homopolymers and copolymers of diolefins and comonomers containing the terminal group CH$_2$=C<, which comprises adding resorcinol at the beginning of the mastication simultaneously with a thiophenol selected from the group consisting of thiophenols, zinc salts of thiophenols and thiophenol-disulfides.

6. A process for avoiding hardening during mastication, of an iron-salt-containing synthetic rubber selected from the group consisting of diolefin homopolymers and copolymers of diolefins and comonomers containing the terminal group CH$_2$=C<, which comprises adding hydroquinone at the beginning of the mastication simultaneously with a thiophenol selected from the group consisting of thiophenols, zinc salts of thiophenols and thiophenol-disulfides.

7. A process for avoiding hardening during mastication, of an iron-salt-containing synthetic rubber selected from the group consisting of diolefin homopolymers and copolymers of diolefins and comonomers containing the terminal group CH$_2$=C<, which comprises adding a hydroxy hydroquinone at the beginning of the mastication simultaneously with a thiophenol selected from the group consisting of thiophenols, zinc salts of thiophenols and thiophenol-disulfides.

8. A process for avoiding hardening during mastication, of a fatty acid iron-salt-containing synthetic rubber selected from the group consisting of diolefin homopolymers and copolymers of diolefins and comonomers containing the terminal group CH$_2$=C<, which comprises adding a polyhydric phenol at the beginning of the mastication simultaneously with a thiophenol selected from the group consisting of thiophenols, zinc salts of thiophenols and thiophenol-disulfides.

References Cited in the file of this patent
UNITED STATES PATENTS
2,316,949    Garvey _____ Apr. 20, 1943